(No Model.)
C. F. PIKE.
CURVED TUBE FOR PNEUMATIC DESPATCH TUBE SYSTEMS.
No. 566,014. Patented Aug. 18, 1896.
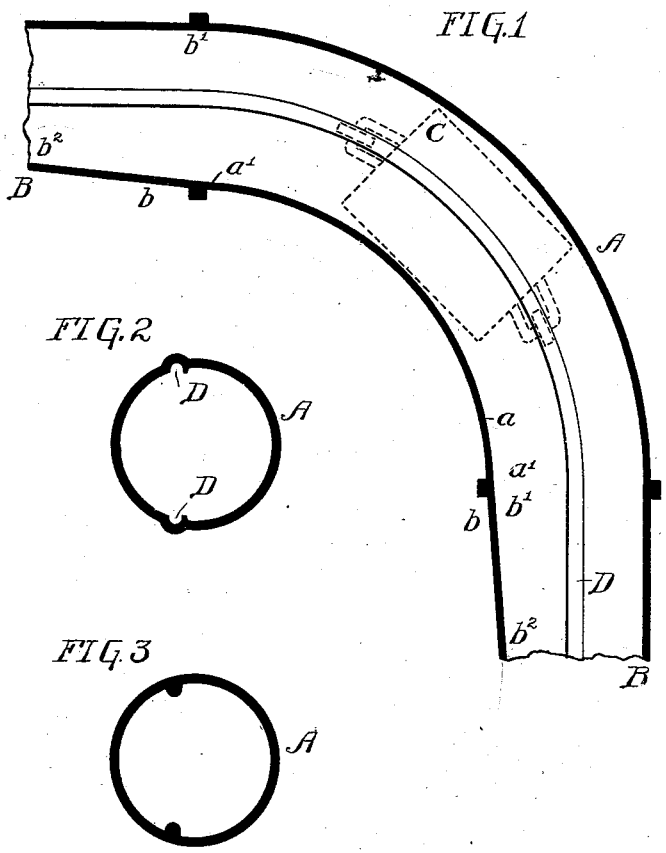

UNITED STATES PATENT OFFICE.

CHARLES F. PIKE, OF PHILADELPHIA, PENNSYLVANIA.

CURVED TUBE FOR PNEUMATIC-DESPATCH-TUBE SYSTEMS.

SPECIFICATION forming part of Letters Patent No. 566,014, dated August 18, 1896.

Application filed May 31, 1895. Serial No. 551,218. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Curved Tubes for Pneumatic-Despatch-Tube Systems, of which the following is a specification, reference being had herein to the accompanying drawings.

My invention has relation to pneumatic-tube systems of the form having track rails or grooves, and particularly to that form of the same which have top and bottom track-grooves for the wheels of an end wheel-supported carrier to travel in; and it has particular relation to the cross-sectional form of the curved or bent tubes and of the adjacent ends of the straight-tube sections joining the curved or bent tubes, and also to the location of the track rails or grooves in said curved or bent parts and in said ends of the straight-tube sections joined to said curved parts.

My invention has for its object to so configure in cross-section the curved or bent tubes and the ends of the straight tubes joined thereto and to so locate the track-grooves in said curved tubes and straight-tube ends that a maximum diameter of carrier approximating to that of the diameter of the bore of the straight tubes of the system and a longer length of carrier can be used, thereby increasing the capacity of the carrier without affecting the speed of travel or ease of movement through the curved or bent tube sections.

In carrying my invention into practice I make the curved or bent tube sections with a bore or inner diameter larger than that of the straight-tube sections, which bore is of the same or unvarying diameter in all directions from end to end of the curved sections. The ends of the straight tubes joining said curved sections are made with a corresponding bore which tapers to the normal bore of the straight-tube sections, and lastly, the track-grooves in said tube ends and curve-sections are located to one side of the vertical center of the same, and this described construction constitutes my invention.

Reference is had to the accompanying drawings, in which—

Figure 1 is a horizontal section showing a curved section of tube and the ends of the straight sections joined thereto with track-grooves embodying my invention. Fig. 2 is a cross-section through the curved tube, and Fig. 3 is a like view showing track-rails instead of track-grooves in the tubes.

A represents a curved or bent tube section which is circular or of a regular form in cross-section and has an inner diameter or bore $a$ larger than that of the normal bore of the straight-tube sections B of the system. The ends $b\ b$ of the straight-tube sections, joined to the ends $a'\ a'$ of the curved-tube section A, have at $b'$ an inner diameter or bore equal to that of the curved section A, which bore or inner diameter gradually tapers to the normal bore $b^2$ of the straight tubes of the system.

D represents the top and bottom track-grooves for the wheels of the end wheel-supported carrier C, which is indicated in dotted lines in Fig. 1. These track-grooves are located to one side of the vertical center of the tube A and of the ends $b$ of tube-sections B, as indicated in Fig. 1 and as more plainly shown in Fig. 2. By so constructing the curved section A and the ends $b$ of tubes B B, joined thereto, and locating the track-grooves to one side of their vertical center a larger diameter and increased length of carrier will travel through the curved tube A without binding, and a carrier of maximum diameter is provided for the system.

Instead of track-grooves, track-rails may be used, as shown in Fig. 3, but I prefer the former.

It is obvious that the foregoing-described cross-sectional configuration of the curved tube A and straight-tube ends $b\ b$, joined thereto, are equally applicable for carriers without wheels, in which case the rails or grooves D are not formed or provided for in the tube-sections.

By tapering the ends of the main-tube sections adjoining the curved sections, the length of the latter can be shortened and the curve made quicker, so as to provide for compactness of form in making curves in confined spaces in laying the tubes of the system. Furthermore, it also admits of a substantially equal or varying bore from end to end of the curved sections, which bore is larger than that of the normal bore of the main tube.

Having thus described my invention, what I claim, and desire to secure by Letters Patent, is—

1. In a pneumatic-tube system, bent or curved tube sections, having from end to end a substantially unvarying or equal bore larger than that of the straight-tube sections, and the ends of the straight-tube sections joined to the ends of the curved sections having a corresponding bore tapering down to the normal diameter or bore of the straight tubes, substantially as set forth.

2. In a pneumatic-tube system, bent or curved tube sections having from end to end a substantially unvarying or equal bore larger than that of the straight-tube sections the ends of the straight-tube sections joined to the ends of the curved sections having a corresponding diameter or bore tapering down to the normal bore of the straight tubes, and top and bottom track-grooves in the vertical center of the straight tubes and out of the line or to one side of the vertical center of the curved tubes and the ends of the straight tubes joined to the ends of the curved tubes, substantially as set forth.

In testimony whereof I have affixed my signature in presence of two witnesses.

CHARLES F. PIKE.

Witnesses:
  THOS. S. RODGERS,
  JOHN H. HUDSON.